Patented July 8, 1924.

1,500,770

UNITED STATES PATENT OFFICE.

ROGER WM. RYAN, OF OCONOMOWOC, WISCONSIN, ASSIGNOR TO CARNATION MILK PRODUCTS COMPANY, OF SEATTLE, WASHINGTON, A CORPORATION OF DELAWARE.

PROCESS OF RECOVERING LACTOSE OR MILK SUGAR FROM MILK OR WHEY.

No Drawing.   Application filed February 28, 1920. Serial No. 361,957.

*To all whom it may concern:*

Be it known that I, ROGER W. RYAN, a citizen of the United States, and a resident of the city of Oconomowoc, in the county of Waukesha and State of Wisconsin, have invented a new and useful Process of Recovering Lactose or Milk Sugar from Milk or Whey, of which the following is a full, complete, and exact description.

This invention relates to an improved process of recovering lactose or milk sugar from milk or whey. Whey is a by-product of cheese factories, and it contains, when fresh, practically all of the lactose originally present in the milk. In the process of cheese making the greater part of the casein and fat is removed from whole milk. Therefore the residue is a much more convenient source of lactose than the original milk. It contains from 4.5% to 6% lactose, .8% protein, (chiefly albumen), 1% to 2% of mineral elements, (chiefly calcium and magnesium salts), and a variable amount of lactic acid depending on the age of the whey and other conditions, and usually varying from about .2% to .8%.

In certain processes for recovering lactose, as now known in the art, whey is concentrated in vacuum pans at about 140° to 150° F., and is admitted to the pans as fast as evaporation takes place, so that the level of the whey in the pans is always practically constant.

When the whey is concentrated to about 30° Baumé it will have about 50% to 60% solids consisting of lactose or milk sugar 46 to 50%, 2 to 3% butter fat, and varying amounts of protein and salts, part of which are suspended in the syrup rather than in solution. It is then removed from the vacuum pans and conducted to crystallizing tanks, where it is cooled by means of coils placed within the tanks. When the temperature reaches about 68° F., the lactose begins to crystallize. The resulting mass is a yellowish moist substance quite similar in its appearance and texture to an ordinary crude cane or beet sugar. This product is then centrifuged, and as it emerges from the centrifugals about one-third is in the form of a heavy syrup. This syrup still contains much lactose, and therefore live steam is passed through the syrup to coagulate the albumen which forms a crust after the syrup has been drawn off. The syrup is now free of protein, and is again conducted to vacuum pans and crystallized, centrifuged, etc. The resulting second crop of lactose recovered yields from .3% to .6%, and as the first crop would yield about 3.8% lactose the maximum yield which is obtained by means of such prior art processes is usually about 4.2%. This is all crude yellow lactose, which must subsequently be refined.

In the refining process the lactose is dissolved at about 120° F. while subjected to agitation in a suitable vessel. The proteins are precipitated by phosphoric acid or other suitable agent, and the liquid is brought up to 205° F., at which time the phosphoric acid is precipitated by adding magnesium sulphate. It is then raised to a temperature above boiling point, which results in the precipitation of mineral salts and their collection in the bottom of the vessel. The liquid is then run through filter presses and thence to vacuum pans, where it is concentrated to about 32° or 33° Baumé, and consists of about 60% sugar. This product is crystallized, as above described, centrifuged, dried by hot air and then cooled and ground to a fine powder. This final product is clean and perfectly white.

Some manufacturers in the preparation of lactose have added ¼% to ½% of alum, (aluminum sulphate), and after careful coagulation of the protein and filtering of the whey, have endeavored to neutralize the acid calcium phosphate and the lactic acidity, and to decompose the alum by the addition of lime or milk of lime.

The inter-action between the lime or milk of lime, (calcium hydroxide) and alum, (aluminum sulphate) produces slightly soluble calcium sulphate, together with a gelatinous aluminum hydroxide. This aids mechanically in the removal of protein, but in the heating of whey after the addition of lime to coagulate protein there is great danger of decomposing the lactose. It has been found that lactose decomposes to a considerable extent in alkaline solutions. Some manufacturers have sought to avoid the danger of this decomposition of lactose in alkaline solutions by adding sufficient acid to neutralize the solution or render it slightly acid in addition to precipitating calcium salts as the slightly soluble sulphate. Great difficulty has been found in successfully accomplishing this result. A slight excess of sulphuric acid which is commonly used, will again cause the decomposition of lactose. Thus, when the whey is heated in an alkaline solution or when acidified with mineral acids, such as sulphuric or phosphoric acid, decomposition of lactose takes place, resulting in a decreased yield. In addition the solubility of the calcium sulphate which is formed causes a loss of lactose. This is due to the entrainment of the lactose in the molasses from the whey, which has been concentrated to the crystallizing point, and the lactose removed as completely as possible. After several crystallizations of lactose have been made the remaining molasses is practically valueless.

In addition it has been found very difficult to secure a maximum removal of the protein in these prior art processes. Protein can be precipitated at two points. First, that of .2% acid calculated as lactic acid, and second at the point of very slight acidity, viz, from 0.001% to 0.004% normal, using phenolphthalein as an indicator. In practice I have found the second method to be much superior in point of protein removal, but have experienced great difficulty in securing acidity within the limits named. In addition the higher acidity increases the solubility of calcium and magnesium salts, and for this reason is to be avoided.

My present improvement therefore consists in a simple and effective process for recovering lactose from milk or whey, whereby a maximum yield of lactose, as well as of the protein constituent may be obtained.

To this end by invention consists in adding to whey which has been partly clarified by the addition of about ½% alum and then boiled, filtered and cooled, such amounts of lime or milk of lime as will neutralize the acidity due to lactic acid, acid calcium phosphates and alum, and will decompose the alum and also provide a slight excess of alkalinity to insure the decomposition of the alum and to cause the removal of nitrogenous matter, such as protein by forming insoluble calcium carbonate upon the introduction of carbon dioxide gas into the whey. The carbon dioxide acts to neutralize the excess lime, precipitating it as calcium carbonate, and precipitating the calcium sulphate resulting from the decomposition of alum in the form of calcium carbonate.

The carbon dioxide further effects the precipitation of practically all of the natural calcium and magnesium salts of the original milk as carbonates. Sufficient additional carbon dioxide is introduced into the solution to give it an acidity of about .01% normal. Carbon dioxide when dissolved in water forms carbonic acid $H_2CO_3$, serving to neutralize alkaline solutions and to precipitate alkaline earth metals and their salts as their carbonates. The carbon dioxide also acts to cause the phosphorus constituents of the milk to combine with potassium set free by the decomposition of the alum and to be removed from the whey by precipitation. Investigations which I have made indicate that the effect of carbon dioxide in clarifying whey is due very largely to the action of the carbon dioxide on the phosphates and that the action of the carbon dioxide on the phosphates is of even greater importance than its acidifying influence. The whey is now heated to 180° F., or above to coagulate the nitrogenous matter and to decompose acid phosphates and carbonates of calcium and magnesium which are produced by the excess carbon dioxide. The heating is continued until the acidity of the solution has been lowered to from .001 to .004 normal. This decrease in the acidity is due to the decomposition of the excess carbonic acid upon heating into gaseous carbon dioxide which is liberated. After filtering the clear filtrate is condensed to the crystallizing point and the lactose then recovered in the usual manner.

Calcium sulphate has a solubility of .178 parts per 100 in hot water and .179 parts per 100 in cold water, while calcium carbonate has a solubility of only .088 per 100 in hot water and a very low solubility of only .0013 per 100 in cold water. Thus the solubility of the carbonate is less than .01 of that of the sulphate in moderately cold water.

In addition sulphate of magnesium, which is formed when sulphuric acid is used as the neutralizing agent, is very soluble in water. 26.9 parts of magnesium sulphate are soluble in 100 parts of cold water and 73.8 per 100 in hot water. Magnesium carbonate is very slightly soluble in hot water, viz, .0106 parts per 100. Therefore it is seen that in the ordinary method of recovering lactose all of the magnesium salts remain in the clarified whey. Since the magnesium salts make up about 8% of the total mineral constituents of whey, this will cause a considerable loss of lactose in the final molasses. In addition to this the lime used in neutralizing the acidity of the whey contains from .5% to 40% magnesium oxide. This oxide would interact with the sulphuric acid to form soluble magnesium sulphate. Thus it is apparent that by the use of carbon dioxide in the manner above described, it is possible to secure the almost complete removal of calcium and magnesium salts, both those which are natural to the milk and those which are added during the process of lactose recovery. In addition the easily regulated and gradual change of acidity makes a very complete removal of the protein possible. Accordingly there will be a much smaller loss in the final uncrystallizable molasses owing to the decreased content of calcium and magnesium salts, as well as the decreased protein content.

Finally I have found that a slight excess of the carbonic acid will not decompose lactose as is the case with mineral acids, such as sulphuric and phosphoric acid. Hence it is possible to obtain, by means of my improved process, much higher yields of lactose than the processes now in general use will produce.

It is to be noted that the carbon dioxide, $CO_2$, is introduced into the milk or whey after it has been neutralized with lime. In this way I secure a maximum precipitation of protein and at the same time an almost complete removal of calcium and magnesium salts as their neutral carbonates.

In actual practice the improved process has been found to give excellent results, and while I have herein described, a particular manner in which the process may be carried out, it is, nevertheless, to be understood that the successive steps of the process as described are susceptible to certain modifications, and I accordingly reserve the privilege of resorting to such legitimate changes as may be fairly embodied in the spirit and scope of the invention as claimed.

What I claim is:

1. In the process of recovering lactose from milk or whey which has been first partially clarified by the addition of alum and by then boiling, filtering and cooling the milk or whey; adding lime to the partially clarified milk or whey in sufficient quantity to neutralize acidity, and produce an excess of alkalinity, and then introducing carbon dioxide into the solution in sufficient quantity to neutralize the excess lime and precipitate the same together with the naturally occurring calcium and magnesium as carbonates.

2. In the process of recovering lactose from milk or whey which has been first partially clarified by the addition of alum and by then boiling, filtering and cooling the milk or whey; adding lime to the partially clarified milk or whey in sufficient quantity to neutralize acidity, and produce an excess of alkalinity, introducing carbon dioxide into the solution while in substantially its original volume in sufficient quantity to neutralize the excess lime and precipitate the same together with the naturally occurring calcium and magnesium as carbonates, then heating the solution to above 180° F., to remove the excess carbon dioxide and precipitate the nitrogenous matters, and finally evaporating the solution to crystallize the lactose.

In testimony that he claims the foregoing as his invention, he has signed his name in presence of two subscribing witnesses.

ROGER WM. RYAN.

Witnesses:
 GEO. GRINDROD,
 CHAS. H. SCHUELE.